April 2, 1963

R. E. McAFEE ET AL 3,083,790

LUBRICATING MEANS FOR A POWER TRANSMISSION

Filed June 15, 1961

Inventors:
Robert E. McAfee
James R. Eddy
Robert L. Moser

Atty.

April 2, 1963

R. E. McAFEE ET AL 3,083,790

LUBRICATING MEANS FOR A POWER TRANSMISSION

Filed June 15, 1961

Inventors:
Robert E. McAfee
James R. Eddy
Robert L. Moser

Paul O. Pierres

Atty.

United States Patent Office 3,083,790
Patented Apr. 2, 1963

3,083,790
LUBRICATING MEANS FOR A POWER
TRANSMISSION
Robert E. McAfee, Fort Wayne, James R. Eddy, North Webster, and Robert L. Moser, Columbia City, Ind., assignors to International Harvester Company, Chicago, Ill., a corporation of New Jersey
Filed June 15, 1961, Ser. No. 117,387
14 Claims. (Cl. 184—6)

This invention relates to lubricating means for a power transmission and more particularly to a new and improved lubricating means for supplying the shaft bearings and other relatively movable machine parts of a motor vehicle power transmission with lubricant under pressure.

Power transmissions to which the present invention pertains include an enclosure or transmission casing or housing, the bottom portion thereof defining a lubricant-containing sump or reservoir. In many power transmissions, the transmission housing is provided with bearings for rotatably supporting a plurality of shafts vertically spaced with respect to each other. In the ordinary power transmission construction utilizing a plurality of vertically spaced shafts certain of the gears and other components supported by the lowermost shaft operate completely or partially in the lubricant contained in the lubricant reservoir or sump of the transmission housing. Because of the construction and arrangement of the various components of a multi-shaft power transmission, certain shaft bearings are disposed at a higher lever than the lubricant in the transmission housing reservoir. Thus, power transmission designers have been confronted with the problem of providing a lubricant system for conducting lubricant from the reservoir to certain bearings and other moving parts of the transmission requiring lubrication which are located substantially above the oil reservoir and as a result many proposals have been advanced to solve the problem. The proposed solutions fall in one of two general catagories, namely, those which require the incorporation of a positive action pump for delivering lubricant to the bearings and various other moving parts of the transmission vertically spaced above the oil reservoir and those which are termed splash systems and which rely upon centrifugal force to throw lubricant from the gears and other machine parts supported on the lowermost shaft as they rotate in the oil contained in the transmission housing reservoir to the upper bearings and various machine parts of the transmission vertically spaced above the oil sump. In the latter type of lubrication system, although desirable from the standpoint of simplicity of construction and economy of manufacture, has several serious drawbacks. As an example, when the transmission is operating at slow speeds the centrifugal force produced is inadequate to supply sufficient lubricating oil to the bearings and other machine parts requiring lubrication vertically spaced above the oil sump and as a result such bearings and machine oftentimes fail. Furthermore, as the lubricant level in the reservoir becomes lower because of continued use over a prolonged period, the amount of lubricant conveyed by centrifugal force becomes inadequate to properly lubricate the bearings and other moving parts, and thus, lubrication of all of the vital parts of the power transmission could not be depended upon. In general, the former or pressure type of lubricating system is employed in power transmissions to overcome the various shortcomings noted above of splash feed lubrication system, but the employment of pressure type lubricating systems for power transmissions renders the power transmission more complex and less economical to manufacture. In general, pressure type lubricating systems entail the utilization of positive type pumps which are usually gear or centrifugal pumps. Many positive type pumps operate at peak efficiency only when run at speeds which are inconsistent with the speeds of the transmission shafts. Thus, such pumps have to be driven from one of the transmission shafts through suitable speed reducing gears or the like in order to function efficiently. In general, the pump and the drive means therefore are mounted within the transmission housing and while numerous attempts have been made to make such pumps having the required capacity compact, difficulty has been experienced to locate the pumps and the drive means therefor within the transmission housing where space is at a premium. Furthermore, the pumps and drive means therefor added considerably to the overall cost of manufacturing the power transmission and the subsequent cost for maintaining the same in efficient operating condition. It is, therefore, one of the primary objectives of the present invention to provide means for supplying lubricant to shaft bearings and other machine parts of a power transmission requiring lubricant which are located above the normal level of lubricant in the lubricant reservoir of the transmission housing under all conditions of operation, and which means involves the utilization of a screw thread type, positive pump.

In automotive vehicles such as motor trucks designed for heavy duty off the highway operations and employing a power dividing transfer case having a power take-off shaft incorporated therein wherein the vehicle may be selectively operated as a two-wheel drive vehicle or a four-wheel drive vehicle and the power take-off shaft may be operated when the vehicle is being used as a two or four-wheel drive vehicle to operate auxiliary equipment, the power take-off shaft is oftentimes mounted in an anti-friction bearing which is spaced considerably above the normal level of the lubricant in the lubricant sump. Heretofore, the power take-off shaft bearing frequently failed to receive sufficient lubrication when the vehicle was initially started and the lubricating system did not respond quickly enough to supply the power take-off shaft bearing with sufficient lubricant and as a result, the bearing overheated and its life was substantially shortened. It is, therefore, an important object of the present invention to provide an auxiliary reservoir for collecting lubricant fed under pressure from the lubricant sump disposed vertically below the auxiliary reservoir and for starting the lubricant at a higher level than the body of oil in the sump and to provide means for effectively supplying the bearing with oil from the auxiliary reservoir in order that the bearing is adequately lubricated under all conditions of operation.

A still further object is to provide an inexpensive screw thread type pump for circulating lubricant through a power transmission under pressure which requires a minimum of space within the transmission housing which is partially formed by one of the power transmission gears in a novel manner.

Still another important object of the present invention is to provide a lubricating system for a power transmission capable of supplying copius amounts of lubricant under pressure to various moving parts of the transmission continuously during operation thereof without the necessity of employing an expensive gear or centrifugal type lubricating pump for producing the fluid pressure head for circulating the lubricant.

The foregoing and other important objects and desirable features inherent in and encompassed by the invention together with many of the purposes and uses thereof will become readily apparent from a reading of the ensuing description in conjunction with the annexed drawings in which:

FIGURE 4 is a sectional view taken substantially along line 4—4 of FIGURE 2.

Figure 1:
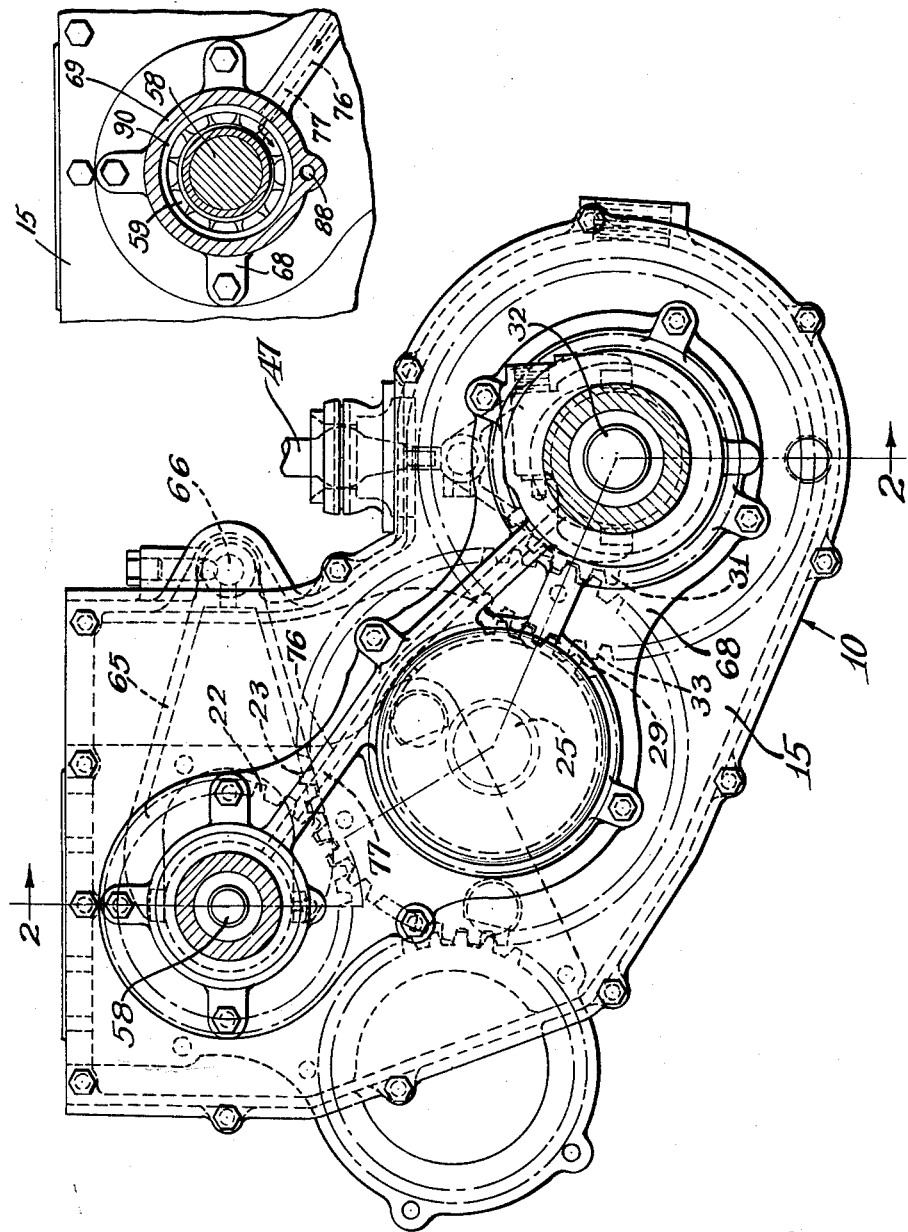
FIGURE 1 is an end elevational view of a motor vehicle power transmission of the transfer case type incorporating the invention, certain parts thereof are in section to better illustrate the invention.

Referring to the drawings in detail, wherein like reference characters represent like elements throughout the various views, a motor vehicle transfer gear case or housing 10 is shown. At the onset, it is to be understood that while the invention will be described in detail in conjunction with a power transmission of the transfer gear type, it can also be applied to various other types of power transmissions without departing from the spirit and scope of the invention. One generally vertical wall 11 of the transfer gear case 10 is secured to the main vehicle transmission (not shown) and serves as a common wall for both the transfer gear case and the transmission housing. The transfer gear case 10 and the transmission housing are suitably connected together and are supported on the vehicle chassis frame in a conventional manner. The vertical wall 11 is provided with a circular opening 12, and secured to the vertical wall over the opening 12 is an axially extending extension 13. The transfer gear case 10 is preferably formed in two sections 14, 15 which are split on the line 16 and the removable end wall 15, axially spaced and substantially parallel to the vertical wall 11 and serving as one of the two sections, is secured to the other section 14 by means of bolts 17 in a conventional manner.

Figures 2, 3:
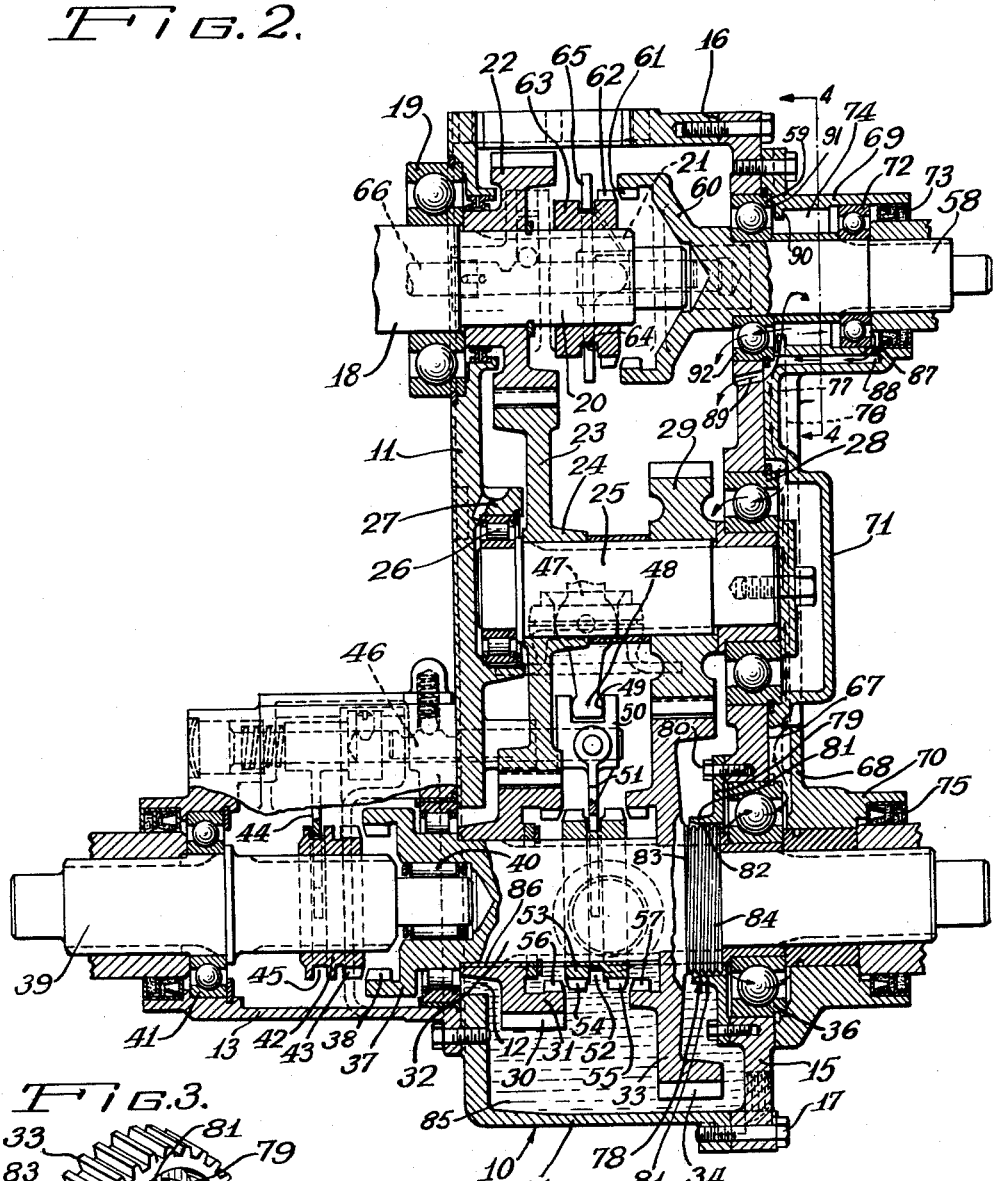
FIGURE 2 is a sectional view taken substantially along the line 2—2 of FIGURE 1.
FIGURE 3 is a perspective view of a power transmission gear modified in accordance with the invention to function as a pump element.

An input shaft 18 which is drivingly connected to the output shaft of the main transmission in a conventional manner extends through the end wall 11 and is journalled for rotation in an anti-friction type ball bearing 19. A section 20 of the input shaft 18 disposed within the transfer gear case 10 is provided with splines 21. The main drive gear 22 of the transfer gear transmission is keyed or otherwise secured to the input shaft 18 so as to be non-rotatably supported thereby. The main drive gear 22 which rotates whenever the input shaft 18 rotates is constantly in meshing engagement with a gear 23. The hub 24 of the gear 23 is keyed to an intermediate section of countershaft 25 which has its longitudinal axis vertically spaced below and parallel to the longitudinal axis of the input shaft 18. The lefthand end of the countershaft 25, as viewed in FIGURE 2, is rotatably supported by an anti-friction bearing 26 carried in a tubular bearing supporting portion 27 formed integral with the end wall 11. The opposite end of the countershaft 25 is disposed in a circular opening in the end wall 15 and is rotatably supported by an anti-friction bearing 28 secured to the end wall 15 in the wall opening.

The countershaft 25 also carries a second gear 29 of smaller diameter than, and axially spaced from, the gear 23. The gear 29 is suitably secured to the countershaft 25 so as to be rotatable in unison with the countershaft 25 and the gear 23. The teeth of the gear 23 constantly mesh with the external teeth 30 of a gear 31 rotatably supported on a power output shaft 32. The output shaft 32 also rotatably supports a gear 33 provided with external teeth 34 which are in meshing engagement with the teeth 35 of the gear 29 secured to the countershaft 25. It is to be understood that the gears 31 and 33 are free to rotate with respect to each other and the supporting output shaft 32 but are incapable of moving axially along the rotational axis of the output or driven shaft 32.

As viewed in FIGURE 2, the right hand end section of the output shaft 32 extends through the end wall 15 and is rotatably supported by means of an anti-friction bearing 36 carried by the end wall 15. The output shaft 32 extends through the end wall 11 and the end extending beyond the wall 11 is formed to provide a gear 37 having internal clutch or dental teeth 38. A second output shaft 39 in axial alignment with the shaft 32 extends through the tubular extension 13 and the innermost end thereof is reduced and is journalled in a bearing 40 mounted in the gear 37. The output shaft 39 is also rotatably supported by an antifriction bearing 41 carried by the extension 13. A dog clutch 42 having external dental teeth 43 formed on one axial end thereof is splined on the output shaft 39 so as to be slidable with respect to the shaft 39 along the rotational axis thereof. The clutch 42 is slidable to and from a position wherein the external teeth 43 thereof are in engagement with the internal clutch or dental teeth 38 of the gear 37 for detachably coupling the output shafts 32 and 39 together. The dog clutch 42 is moved into and out of coupling engagement with the gear 37 by means of an operating fork 44 which is in engagement with an annular groove 45 in the dog clutch 42. The fork 44 is operatively connected to a shift rail 46. The shift rail 46, in turn, is moved along its longitudinal axis by means of a shift lever 47 partially shown in FIGURE 2. The shift lever 47 has one end provided with a generally spherical knob 48 which is disposed in a socket 49 formed in a collar 50 secured to the end of the shift rail 46 disposed within the transfer gear case 10. The means for detachably coupling the output shafts 32, 39 together including the means for sliding the dog clutch 42, described hereinbefore, forms no part of the present invention, but it is to be understood that rocking of the shift lever 47 in a particular manner effects coupling and uncoupling of the output shafts 32, 39.

Rigidly secured to the collar 50 is a fork 51 which is received in an annular groove 52 provided in a sliding dog clutch 53 splined to the output shaft 32 intermediate the gears 31 and 33. The axial ends of the sliding dog clutch 53 are provided with an annular series of clutch or dental teeth 54, 55 respectively. The dog clutch 53 is slidable to the left from the neutral position thereof shown in FIGURE 2, to effect coupling of the clutch teeth 54 with an annular series of internal teeth 56 formed on the gear 31. When this occurs, the gear 31 is non-rotatably or drivingly connected to the output shaft 32. In the same manner, movement of the clutch 53 to the right from the neutral position shown in FIGURE 2, effects clutching engagement of the external teeth 55 with an annular series of internal clutch teeth 57 formed on one face of the gear 33 and, when this occurs, the output shaft 32 is drivingly connected to the gear 33. From the foregoing, it will be appreciated that regardless of the positions of the clutches 42 and 53, both gears 31 and 33 rotate whenever the transfer gear case is transmitting power and the input shaft 18 is rotating.

The transfer gear case 10 includes a power take-off shaft 58 which is in axial alignment with the input shaft 18 and therefore is spaced considerably above the output shafts 32 and 39. The power take-off shaft 58 extends through a circular opening in the end wall 15 in which is disposed an anti-friction bearing 59 for rotatably supporting the shaft 58. A gear 60 integrally formed on the innermost end of the power take-off shaft 58 is provided with an annular series of internal clutch or dental teeth 61 which are selectively meshable with an annular series of external dental teeth 62 formed on one axial end of a dog clutch 63 slidably but non-rotatably mounted on the splines 21 of the input shaft section 20. The dog clutch 63 is shown in its neutral or uncoupled position in FIGURE 2. The dog clutch 63 is provided with an annular groove 64 to receive a shifter fork 65 (partially shown in FIGURE 2) mounted on a slide or shift rail 66 operatively connected to suitable control lever means (not shown). When the dog clutch 63 is in the position shown in FIGURE 2, the power take-off shaft 58 is not in operation. By shifting the dog clutch 63 to the right, as viewed in FIGURE 2, the dog clutch teeth 62 are brought into meshing engagement with the dental teeth 61 of the power take-off gear 60 and the power take-off shaft 58 is coupled directly to the input shaft 18.

Bolted to the outwardly facing flat surface 67 of the end wall 15 by means of a plurality of bolts is a plate-like bearing retainer 68. The bearing retainer 68 is formed to provide an upper outwardly projecting tubular section 69, a lower outwardly projecting tubular section 70 and an intermediate outwardly bulged portion 71. When the plate-like bearing retainer 68 is secured in place on the end wall 15, the outwardly bulged portion 71 is positioned over the circular opening in the end wall 15 in which the outer end of the countershaft 25 is disposed. The power take-off shaft 58 extends through the upper tubular section 69 and similarly the output shaft 32 extends axially through the lower tubular section 70. An anti-friction bearing 72 disposed within the upper tubular section 69 and axially spaced from the bearing 59 is utilized to additionally rotatably support the power take-off shaft 58. Suitable oil and dust rotary shaft sealing means, designated generally by numeral 73, is provided between the outermost end of the upper tubular section 69 and the power take-off shaft 68 to prevent the entrance of undesirable foreign matter into the upper tubular section 69 and the escape of lubricant therefrom. The anti-friction bearings 59 and 72 and the inner surface of the upper tubular section 69 extending between the bearings partially define an annular lubricant-receiving chamber or reservoir 74, the purpose of which will be pointed out hereinafter. The outermost end of the lower tubular section 70 is also provided with an annular oil and dust rotary shaft sealing means 75 which functions and is similar to the sealing means 73 described hereinbefore.

As shown in FIGURE 1, the face of the platelike bearing retainer 68 which abuts the end wall 15 is provided with an elongated groove 76, the lower end of which is adjacent to the anti-friction bearing 33. The upper or opposite end extends to the lubricant-receiving reservoir 74. With the plate-like bearing retainer 68 rigidly fastened to the end wall 15 it will be appreciated that a lubricant-carrying duct 77 is provided which extends from the outer axial end anti-friction bearing 36 to the interior of the lubricant-receiving reservoir 74. The lubricant-carrying duct 77 also opens into the outwardly bulged portion 71 and thus is in fluid communication with the anti-friction bearing 28 of the countershaft 25.

In order to supply the lubricant-receiving reservoir 74 and the interior of the outwardly bulged portion 71 with lubricant under pressure when the transfer gear case is in operation, a novel pump, designated generally by 78, is provided. Referring to FIGURE 3 wherein the pump 78 is shown in detail, the pump 78 comprises a generally circular plate 79 which is fastened to the end wall 15 on the face thereof opposite the bearing retainer 68 by means of cap screws 80 or the like. The plate 79 is provided with a central axially extending integrally formed annular flange 81, the inner wall surface of which defines a bore 82 through which the output shaft 32 extends. One axial portion end of the cylindrical hub 83 of the gear 33 mounted on the output shaft 32 extends into the bore 82 and the outer peripheral surface thereof is provided with a square screw thread or screw vane 84. The cylindrical screw thread 84 has substantially the same length and diameter as the bore 82 and obviously is capable of rotating with respect to the plate 79.

The bottom of the transfer gear case 10 is formed to provide an oil sump 85 for containing a quantity of lubricant. As shown in FIGURE 2, the normal operating level of the lubricant collected in the oil sump 85, indicated by reference character 86, and consequently a portion of the hub 83 of the gear 33 is continually submerged below the lubricant level 86. Thus, a part of the pump 78 is completely submerged in the lubricant contained within the oil sump 85. As stated hereinbefore, whenever the power transmission is in operation and the input shaft 18 is rotated, the gear 33 also is rotated. The square screw thread 84 is formed on the hub 83 in such a manner that as the gear 33 rotates, lubricant enters the left end of the bore 82, as viewed in FIGURE 2 and the screw thread 84 displaces lubricant along the inner wall of the flange 81 defining the bore 82 to force it under pressure from the right end of the bore 82 through the anti-friction bearing 36 to the lowermost end of the duct 77. Lubricant under pressure then flows upwardly through the duct 77 and empties into the interior of the lubricant-receiving reservoir 74 which is located a considerable distance above the normal operating level 86 of the lubricant contained in the oil sump 85. A portion of the lubricant flowing through the duct 77 flows to the space defined by the outwardly bulged portion 71 of the bearing retainer 68 and the anti-friction bearing 28. The lubricant then flows through the countershaft anti-friction bearing 28 to lubricate the same and is allowed to drain by gravity to the sump 85. In a similar manner, the lubricant under pressure received in the reservoir 74 is utilized to lubricate the anti-friction bearings 59 and 72. A portion of the lubricant received in the reservoir 74 returns to the sump 85 by gravity after first passing through the anti-friction bearing 59. The portion of the lubricant received in the reservoir 74 flowing axially to the right, as viewed in FIGURE 2, through the anti-friction bearing 72 is allowed to return to the lubricant sump 85 by gravity through an oil return passageway which includes a relatively short port 87 extending radially from the bottom of the lubricant reservoir 74 between the anti-friction bearing 72 and the sealing means 73 to one end of an axially extending duct 88. The opposite end of the duct 88 is in registration with an opening 89 formed through the end wall 15 when the bearing retainer 68 is assembled on the end wall 15. From the foregoing it will be appreciated that after a few revolutions of the gear 33 after commencing rotation of the input shaft 18, the lubricant-receiving reservoir 74 will be sufficiently filled with oil to insure an adequate supply of lubricant for lubricating the anti-friction bearings 59 and 72 and the reservoir 74 will be continuously replenished with lubricant during operation of the power transmission. It will be further appreciated that the anti-friction bearings 28 and 36 are also pressure lubricated during operation of the power transmission.

From the foregoing description it will be seen that as long as the lubricant receiving reservoir 74 is partially filled with oil, the anti-friction bearings 59 and 72 of the power take-off shaft 58 will be adequately lubricated and the amount of oil present in the reservoir 74 depends upon the pumping action of the pump 78. As pointed out above, the reservoir 74 contains a sufficient quantity of oil after a few revolutions of the gear 33 to insure positive lubrication of the anti-friction bearings 59 and 72. While the time required to deliver lubricant from the oil sump 85 to the lubricant-receiving reservoir 74 after the gear 33 commences to rotate is minute, the invention contemplates means for storing a sufficient quantity of lubricant in the reservoir 74 for lubricating the bearing 72 during this short period of time. This is accomplished by disposing the end of the duct 77 opening into the lubricant receiving reservoir 74 at a point vertically spaced above the bottom of the lubricant reservoir 74 and providing a dam in the form of an integrally formed annular flange 90 extending radially inwardly from the innermost axial end of the upper tubular section 69 adjacent the outermost end face 91 of the outer race 92 of the anti-friction bearing 59, as best illustrated in FIGURE 4.

It will be appreciated that the quantity of lubricant in the reservoir 74 must have a depth greater than the height of the dam before it will overflow the dam to lubricate the bearing 59. It is to be understood that the lubricant reservoir 74 receives a quantity of lubricant during operation of the power transmission of an amount and rate that the bearing 59 is continuously supplied with lubricant. However, when the power transmission is at rest the lubricant in the duct 77 drains back to the sump 85 by gravity, but since the opening of the duct 77 into the lubricant receiving reservoir 74 is vertically spaced above the bottom of the reservoir 74 a quantity of lubricant is maintained in the lubricant reservoir 74 even though the power transmission is at rest. Consequently during the first few revolutions of the gear 33, before sufficient lubricant is delivered to the lubricant reservoir 74 to cause overflowing of the dam, the bearing 72 is at least provided with sufficient lubrication in the event the power take-off shaft 58 is drivingly coupled to the input shaft 18 when the power transmission commences to operate. From the foregoing it will be appreciated that a novel lubricating system for a power transmission has been provided which will continuously provide a copious amount of lubricant under pressure to various anti-friction bearings of the transmission whenever the transmission is in operation without the necessity of having an expensive conventional gear-type lubricating pump to accomplish the same objective. It will also be appreciated that the lubricant reservoir 74 is always partially filled with oil, and consequently the power take-off shaft anti-friction bearing 72 will be adequately lubricated under all conditions of operation of the power transmission. It is also believed clear that because of the disposition of the opening of the duct 77 into the lubricant reservoir 74 and the dam, and the fact that the lubricant reservoir 74 is substantially sealed by the sealing means 73, once the power transmission is initially operated the reservoir 74 will maintain in storage a sufficient amount of oil to lubricate the bearing 72 even during those first few revolutions of the gear 33 occurring each subsequent cycle of operation of the power transmission. It will also be appreciated that the anti-friction bearings 28, 59 and 72 will be properly lubricated even through they are located above the normal level of the lubricant in the sump 85 and regardless of the speed of rotation of the gear 33.

The embodiment of the invention chosen for the purposes of illustration and description herein is that preferred for achieving the objects of the invention and developing the utility thereof in the most desirable manner, due regard being had to existing factors of economy, simplicity of design and construction, production methods and the improvement sought to be effected. It will be appreciated, therefore, that the particular structural and functional aspects emphasized herein are not intended to exclude but rather to suggest such other adaptations and modifications of the invention as fall within the spirit and scope of the invention as defined in the appended claims.

What is claimed is:
1. In a power transmission having a casing provided with a sump in the lower portion thereof adapted to contain lubricant at a certain normal operating level and a plurality of relatively movable machine parts above the normal operating level of the lubricant requiring lubrication; means for supplying said plurality of relatively movable machine parts with lubricant under pressure whenever the power transmission is in operation including a cylindrical member having a bore extending horizontally therethrough, one end of said member serving as a lubricant inlet and the opposite end serving as a lubricant outlet, said cylindrical member being horizontally disposed in said sump and having a lower portion thereof below the normal operating level of the lubricant in said sump, a cylindrical element extending horizontally into said bore having a screw thread formed on its outer peripheral surface, bearing means adjacent said cylindrical member for supporting said cylindrical element, said member and element being relatively rotatable about a horizontally extending axis when the power transmission is in operation to effect displacement of lubricant along the wall of said member defining said bore to force lubricant under pressure from said lubricant outlet and through said bearing means, and duct means in fluid communication with said bearing means and said plurality of said relatively movable machine parts.

2. In a power transmission having a casing provided with a sump in the lower portion thereof adapted to contain lubricant at a certain normal operating level and a plurality of relatively movable machine parts above the normal operating level of the lubricant requiring lubrication; means for supplying said plurality of relatively movable machine parts with lubricant under pressure whenever the power transmission is in operation including a cylindrical member having a bore extending horizontally therethrough, one end of said bore serving as a lubricant inlet and the opposite end serving as a lubricant outlet, said cylindrical member being horizontally disposed in said sump and having a lower portion thereof below the normal operating level of the lubricant in said sump, a cylindrical element extending horizontally into said bore having a screw thread formed on its outer peripheral surface, said screw thread being of substantially the same length and diameter as the wall of said member defining said bore, bearing means adjacent said cylindrical member for supporting said cylindrical element, said member and element being relatively rotatable when the power transmission is in operation to effect displacement of lubricant along the wall of said member defining said bore to force lubricant under pressure horizontally from said lubricant outlet and through said bearing means, and duct means in fluid communication with said bearing means and said plurality of said relatively movable machine parts.

3. In a power transmission having a casing provided with a sump in the lower portion thereof adapted to contain lubricant at a certain normal operating level and a plurality of relatively movable machine parts above the normal operating level of the lubricant requiring lubrication; means for supplying said plurality of relatively movable machine parts with lubricant under pressure whenever the power transmission is in operation including a generally vertically disposed stationary plate having an opening therethrough and an integrally-formed, cylindrical flange encircling said opening and projecting horizontally from the general vertical plane containing the plate, said flange having a lower portion thereof disposed below the normal operating level of lubricant in said sump, one end of said flange serving as a lubricant inlet and the opposite end serving as a lubricant outlet, a cylindrical element bearing means adjacent to the side of said plate opposite said flange for rotatably supporting said cylindrical element in said casing, said cylindrical element being rotatable relative to said plate when the power transmission is in operation, said cylindrical element extending horizontally into the bore defined by the interior wall of said flange and having a screw thread formed on its outer peripheral surface, said screw thread being of substantially the same length and diameter as said bore whereby rotation of said cylindrical element with respect to said flange effects displacement of lubricant along the interior wall of said flange to force lubricant under pressure horizontally from said lubricant outlet and through said bearing means, and duct means in fluid communication with said bearing means and said plurality of relatively movable machine parts.

4. In a power transmission having a casing provided with a sump in the lower portion thereof adapted to contain lubricant at a certain normal operating level and a plurality of relatively movable machine parts above the normal operating level of the lubricant requiring lubrication; means for supplying said plurality of said relatively movable machine parts with lubricant under pressure whenever the power transmission is in operation including a generally vertically disposed, stationary plate having an opening therethrough and an integrally-formed, cylindrical flange encircling said opening and projecting horizontally from the general vertical plane containing the plate, said flange having a lower portion thereof disposed below the normal operating level of lubricant in said sump, one end of said flange serving as a lubricant inlet and the opposite end serving as a lubricant outlet, a gear having a cylindrical hub portion, bearing means adjacent to the side of said plate for rotatably supporting said gear in said casing, said gear being rotatable relatively to said plate when the power transmission is in operation, said hub portion extending into the bore defined by the interior wall of said flange and having a screw thread formed on its outer peripheral surface, said screw thread being of substantially the same length and diameter as said bore whereby rotation of said gear with respect to said flange effects displacement of lubricant along the interior wall of said flange to force lubricant under pressure horizontally from said lubricant outlet and through said bearing means, and duct means in fluid communication with said bearing means and said plurality of relatively movable machine parts.

5. In a power transmission having a casing provided with a sump in the lower portion thereof adapted to contain lubricant at a certain normal operating level, a plurality of relatively movable machine parts above the normal operating level of the lubricant requiring lubrication, and a generally horizontal output shaft journaled in said casing and disposed below the normal operating level of lubricant; means for supplying said plurality of relatively movable machine parts with lubricant under pressure whenever the power transmission is in operation including a generally vertically disposed, stationary plate having an opening therethrough through which said shaft extends, said plate having an integrally formed cylindrical flange encircling said opening and projecting horizontally from the general vertical plane containing the plate, a lower portion of said flange being disposed below the normal operating level of lubricant in said sump, one end of said flange serving as a lubricant inlet and the opposite end serving as a lubricant outlet, bearing means adjacent to the end of said flange serving as a lubricant outlet for rotatably supporting said shaft, a gear rotatably mounted on said shaft, said gear being rotatable whenever the power transmission is in operation, said gear having a cylindrical hub portion extending into the bore defined by the interior wall of said flange and having a square screw thread being of substantially the same length and diameter as said bore whereby rotation of said gear effects displacement of lubricant along the interior wall of said flange to force lubricant under pressure horizontally from said lubricant outlet and through said bearing means, and duct means in fluid communication with said bearing means and said plurality of relatively movable machine parts.

6. In a power transmission having a casing provided with a sump in the lower portion thereof adapted to contain lubricant at a certain normal operating level, a plurality of vertically spaced, substantially parallel shafts extending through an end wall of said casing, and an anti-friction bearing for rotatably supporting each of said shafts, each of said anti-friction bearings being supported by said end wall, one of said shafts and the anti-friction bearing associated therewith being partially disposed below the normal operating level of lubricant in said sump; means for supplying said anti-friction bearings with lubricant under pressure whenever the power transmission is in operation including a plate rigidly secured to said end wall, said plate having an opening therethrough and an integrally-formed, cylindrical flange encircling said opening and projecting from the general plane containing the plate, said shaft partially disposed below the normal operating level of lubricant in said sump extending through said cylindrical flange, one end of said flange serving as a lubricant inlet and the opposite end serving as a lubricant outlet, a gear rotatably supported on said shaft partially disposed below the normal operating level of lubricant in said sump, said gear being rotatable whenever the power transmission is in operation and having a cylindrical hub portion extending into the bore defined by the interior wall of said flange, said hub portion having a square screw thread formed on its outer peripheral surface, said screw thread being of substantially the same length and diameter as said bore whereby rotation of said cylindrical hub portion with respect to said flange effects displacement of lubricant along the interior wall of said flange to force lubricant under pressure from said lubricant outlet through said anti-friction bearing associated with said shaft partially disposed below the normal operating level of lubricant in said sump, and duct means in fluid communication with said anti-friction bearing receiving lubricant under pressure from said lubricant outlet and said anti-friction bearings vertically spaced above the normal operating level of lubricant in said sump.

7. In a power transmission having a casing provided with a sump in the lower portion thereof adapted to contain lubricant at a certain normal operating level, a pair of vertically spaced, substantially parallel shafts extending horizontally through a vertical end wall of said casing, one of said shafts being partially disposed below the normal operating level of lubricant in said sump and the other of said shafts being vertically spaced above the normal operating level of lubricant in said sump, an anti-friction bearing for rotatably supporting said one shaft, a pair of axially spaced anti-friction bearings for rotatably supporting said other of said shafts, said pair of bearings partially defining the axial ends of an annular lubricant reservoir; means for supplying all of said anti-friction bearings with lubricant under pressure whenever the power transmission is in operation including a plate rigidly secured to said vertical end wall, said plate having an opening therethrough and an integrally-formed cylindrical flange encircling said opening and projecting horizontally from the general vertical plane containing the plate in a direction away from said anti-friction bearing for rotatably supporting said one shaft, said one shaft partially disposed below the normal operating level of lubricant in said sump extending through said cylindrical flange and being radially spaced from the interior wall of said flange, one end of said flange serving as a lubricant inlet and the opposite end serving as a lubricant outlet, a gear rotatably supported on said one shaft, said gear being rotatable whenever the power transmission is in operation and having a cylindrical hub portion extending into the radial space between said one shaft and the interior wall of said flange, said hub portion having a square screw thread formed on its outer peripheral surface, said screw thread being of substantially the same length and diameter as said flange whereby rotation of said cylindrical hub portion with respect to said flange effects displacement of lubricant along the interior wall of said flange to force lubricant under pressure from said lubricant outlet, and through said anti-friction bearing associated with said one shaft, and duct means in fluid communication with said anti-friction bearing receiving lubricant under pressure from said lubricant outlet and the interior of said lubricant reservoir.

8. In a power transmission having a casing provided with a sump in the lower portion thereof adapted to contain lubricant at a certain normal operating level, and a plurality of relatively movable machine parts above the normal operating level of the lubricant requiring lubrication; a lubricant reservoir above the normal operating level of lubricant in said sump, said reservoir being in fluid communication with said relatively movable machine parts; means for supplying said lubricant reservoir with lubricant under pressure whenever the power transmission is in operation including a horizontally extending shaft, an anti-friction bearing for rotatably supporting said shaft, gear rotatably supported on said shaft with the hub portion thereof partially disposed below the normal operating level of lubricant in said sump, said gear being adapted to rotate whenever the power transmission is in operation, said means further including a cylindrical member having a bore extending horizontally therethrough, one end of said member serving as a lubricant inlet and the opposite end serving as a lubricant outlet, said hub portion extending horizontally into said bore and having a screw thread formed on its outer peripheral surface, said screw thread being of substantially the same length and diameter as said bore whereby rotation of said gear with respect to said cylindrical member effects displacement of lubricant axially along the interior wall of said cylindrical member to force lubricant under pressure from said lubricant outlet and through said anti-friction bearing, and duct means in fluid communication with said anti-friction bearing and the interior of said lubricant reservoir.

9. In a power transmission as set forth in claim 8, wherein said relatively movable machine parts include a second shaft and a pair of axially spaced anti-friction bearings for rotatably supporting said second shaft, and wherein the axially-spaced ends of said lubricant reservoir are partially defined by said pair of axially spaced anti-friction bearings.

10. In a power transmission as set forth in claim 9, wherein said casing includes a vertical end wall, and a plate-like bearing retainer fastened to the outermost surface of said vertical end wall, and said duct means includes a groove formed in said bearing retainer having one end adjacent said anti-friction bearing associated with said shaft rotatably supporting said gear and its opposite end opening into the interior of said lubricant reservoir at a point vertically spaced above the bottom thereof.

11. In a power transmission having a casing including a vertical end wall and being provided with a sump in the lower portion thereof adapted to contain lubricant at a certain normal operating level, said vertical end wall having an opening therein vertically spaced above the normal operating level of lubricant; a plate-like bearing retainer fastened to said vertical end wall with one face of said bearing retainer abutting the outermost surface of said vertical end wall, said plate-like bearing retainer having a tubular section in axial alignment with said opening in said end wall and extending axially outwardly with respect to said end wall; a shaft extending axially through said opening and said tubular section; a pair of anti-friction bearings for rotatably supporting said shaft, one of said bearings being disposed in said opening and the other of said bearings being disposed in said tubular section; a lubricant reservoir above the normal operating level of lubricant in said sump, the axially spaced ends of said lubricant reservoir being partially defined by said anti-friction bearings, said lubricant reservoir including a radially inwardly extending flange integrally formed with said bearing retainer at the end of said tubular section adjacent said opening, the radially innermost peripheral surface of said flange being radially spaced inwardly from the outer race of said anti-friction bearing disposed in said opening; means for supplying said lubricant reservoir with lubricant under pressure whenever the power transmission is in operation including a gear rotatably supported in said casing with the hub portion thereof partially disposed below the normal operating level of lubricant in said sump, said gear being adapted to rotate whenever the power transmission is in operation, said means further including a cylindrical member having a bore, one end of said member serving as a lubricant inlet and the opposite end serving as a lubricant outlet, said hub portion extending into said bore and having a screw thread formed on its outer peripheral surface, said screw thread being of substantially the same length and diameter as said bore whereby rotation of said gear with respect to said cylindrical member effects displacement of lubricant axially along the interior wall of said cylindrical member to force lubricant under pressure from said lubricant outlet; lubricant supply duct means in fluid communication with said lubricant outlet and the interior of said lubricant reservoir at a point vertically spaced above the bottom thereof; and lubricant return duct means extending between the interior of said casing and a point axially spaced outwardly from said anti-friction bearing disposed in said tubular section.

12. In a power transmission as set forth in claim 11 wherein said lubricant supply duct means extending from said lubricant outlet and said lubricant reservoir includes a groove formed in the face of said bearing retainer abutting said vertical end wall.

13. In a power transmission having a casing provided with a sump in the lower portion thereof adapted to contain lubricant at a certain normal operating level, and a plurality of relatively movable machine parts above the normal operating level of the lubricant requiring lubrication, said relatively movable machine parts including a shaft and a pair of axially spaced anti-friction bearings for rotatably supporting said shaft; a lubricant reservoir above the normal operating level of lubricant in said sump, said axially spaced ends of said lubricant reservoir being partially defined by said anti-friction bearings, said reservoir being in fluid communication with said relatively movable machine parts; means for supplying said lubricant reservoir with lubricant under pressure whenever the power transmission is in operation including a gear rotatably supported in said casing with the hub portion thereof partially disposed below the normal operating level of lubricant in said sump, said gear being adapted to rotate whenever the power transmission is in operation, said means further including a cylindrical member having a bore extending therethrough, one end of said member serving as a lubricant inlet and the opposite end serving as a lubricant outlet, said hub portion extending into said bore and having a screw thread formed on its outer peripheral surface, said screw thread being of substantially the same length and diameter as said bore whereby rotation of said gear with respect to said cylindrical member effects displacement of lubricant axially along the interior wall of said cylindrical member to force lubricant under pressure from said lubricant outlet, and duct means in fluid communication with said lubricant outlet and the interior of said lubricant reservoir.

14. In a power transmission as set forth in claim 13, wherein said casing includes a vertical end wall, and a plate-like bearing retainer fastened to the outermost surface of said vertical end wall, and said duct means includes a groove formed in said bearing retainer having one end adjacent said lubricant outlet and its opposite end opening into the interior of said lubricant reservoir at a point vertically spaced above the bottom thereof.

References Cited in the file of this patent
UNITED STATES PATENTS

| | | |
|---|---|---|
| 2,183,485 | Butzbach et al. | Dec. 12, 1939 |
| 2,590,870 | Keese | Apr. 1, 1952 |
| 2,686,992 | Kindt et al. | Aug. 24, 1954 |
| 2,996,148 | Behnke et al. | Aug. 15, 1961 |